Patented Aug. 4, 1925.

1,548,637

UNITED STATES PATENT OFFICE.

PHILIP A. SINGER AND HARRIS PERLSTEIN, OF CHICAGO, ILLINOIS.

PROCESS OF MAKING STARCH CONVERSION PRODUCTS.

No Drawing. Application filed June 4, 1923. Serial No. 643,416.

*To all whom it may concern:*

Be it known that we, PHILIP A. SINGER and HARRIS PERLSTEIN, being citizens of the United States, and residing at Chicago, in the county of Cook and State of Illinois, have invented a certain new and useful Improvement in Processes of Making Starch Conversion Products, of which the following is a specification.

This invention relates to a process for the production of maltose syrup or other starch conversion products by diastatic conversion from unmalted or non-diastatic starchy raw materials. The process in the form herewith described is designed particularly for use with barley malt as the diastase bearing material. It has for one object to provide means whereby the malt is treated so as to act as a satisfactory conversion agent in the production of a high grade of syrup and so that the residue of the malt may still be used to produce other products of a high grade. Other objects will appear from time to time in the specification and claims.

In the processes heretofore employed in making maltose syrup and other starch conversion products by diastatic conversion, the diastase is introduced in one of two ways. First, by direct addition of crushed malt to the prepared unmalted starchy raw materials. This method has the objection that a high percentage of impurities of detrimental quality is introduced. The other process in common use involves the addition to the prepared unmalted starchy raw materials of malt infusion. When this process is carried out a minimum quantity of malt is crushed and the diastase is extracted from this as thoroughly as possible with water. The infusion thus obtained is employed for converting the starch of the prepared unmalted or non-diastatic starchy raw materials. This results in a high grade of product but is materially higher in cost, since the malt residue left after the withdrawal of the infusion is so impoverished in diastatic power that it can only be wasted or used as cattle food or for some other comparatively unprofitable purpose.

In our process we have avoided the difficulties associated with the two processes above described and have retained the advantages of each.

In carrying out our process the diastase is added to the prepared unmalted or non-diastatic starchy raw material, of whatever nature, in the form of an infusion, thus insuring a high quality of product.

The infusion is obtained in the following manner. A somewhat larger quantity of malt is crushed than would be necessary if all of the diastase were to be thoroughly extracted, and it is mixed with water and agitated. Then a portion of the infusion is filtered off or decanted after settling, or drawn off in any suitable manner. The amount of malt used and the proportion of the infusion that is drawn off are so proportioned that there is obtained in that part of the infusion which is removed a quantity of diastase sufficient to convert the starch of the prepared unmalted or non-diastatic starchy raw materials. These have been previously prepared for conversion by cooking with water or by any other suitable manner. The details of this preparation are not here described as they form no part of the present invention, and may be carried out in a variety of ways.

After a sufficient quantity of the infusion has been drawn off, there is left in the remaining malt a sufficient quantity of diastase to enable the use of that malt in the manufacture of a satisfactory commercial malt syrup or extract.

The residual malt with the malt infusion remaining in it, is treated with water at suitable temperatures for the production of wort, from which wort, by filtering or straining in the customary manner, there is produced a malt syrup or malt extract. After the production of the syrup or extract the remaining portion of the grain may be sold as a by-product, for example, used as cattle food.

Thus the malt serves the dual purpose of furnishing the diastase for the conversion of the starch of the prepared unmalted or non-diastatic starchy raw material and of furnishing the raw material for malt syrup, extract, or other malt product. By this means the waste of the malt, which has heretofore been considered unavoidable when a malt infusion was made, is avoided. The combined value of the malt syrup and extract and any by-product, such as cattle food, produced by our method is much in excess of the value of the residual malt waste of the usual malt infusion method above described. So true is this and so much more economical is our process that, whereas in the usual malt infusion method above described the cost of the malt is an expense that must be included in the manufacturing cost of the maltose syrup or other starch conversion products which the factory is making, where our process is used the cost of the malt is largely absorbed in the production cost of the malt syrup or extract, and yet the sale of that malt syrup or extract has resulted in a profit per ton larger than the profit per ton gained by the sale of the maltose syrup or other principal products of the factory.

While we suggest the use of wort, made from the residual malt and infusion, in the manufacture of malt extract and malt syrup, we recognize that it may be used for producing other commercially valuable products, for instance vinegar or alcohol. Our process is not limited, therefore, to the production of malt syrup or extract.

We claim:

The process of manufacturing starch conversion products from malt and cereals which comprises so proportioning the malt and cereal that the enzymes in the malt shall be sufficient to convert the starch from both the malt and cereal, separating in the form of an infusion the amount of enzymes from the malt which are necessary to convert the cereal, converting said cereal, removing and concentrating the wort, then converting the malt residue, and separating and concentrating said wort.

Signed at Chicago, Illinois this 1st day of June 1923.

PHILIP A. SINGER.
HARRIS PERLSTEIN.